Aug. 3, 1954 A. P. PAGES ET AL 2,685,647
METHOD AND DEVICE FOR DECODING GROUPS OF CODED
PULSES REPRESENTING AN INTELLIGENCE WAVE
Filed March 29, 1952 2 Sheets-Sheet 1

Inventors
Andre Paul Pages
Gabriel Henri Leon Dureau
By: Haseltine, Lake & Co.
Agents Aug. 3, 1954 A. P. PAGÈS ET AL 2,685,647

METHOD AND DEVICE FOR DECODING GROUPS OF CODED PULSES REPRESENTING AN INTELLIGENCE WAVE

Filed March 29, 1952 2 Sheets-Sheet 2

Inventors
Andre Paul Pages
Gabriel Henri Leon Dureau
By: Haseltine, Lake & Co.
Agents Patented Aug. 3, 1954

2,685,647

UNITED STATES PATENT OFFICE 2,685,647

METHOD AND DEVICE FOR DECODING GROUPS OF CODED PULSES REPRESENTING AN INTELLIGENCE WAVE

André Paul Pagès and Gabriel Henri Léon Dureau, Paris, France, assignors to Societe Alsacienne de Constructions Mecaniques, Paris, France, a corporation of France Application March 29, 1952, Serial No. 279,442

Claims priority, application France April 16, 1951

4 Claims. (Cl. 250—27)

The present invention relates to telecommunication systems using coded "binary" electric pulses. It is known that, in such systems, successive groups of binary pulses (i. e. pulses of one or of the other of two possible signalling conditions or "values") represent amplitude values periodically sampled with a recurrence period T, out of an intelligence wave of amplitude varying in time which is to be transmitted. More particularly, it relates to telecommunication systems such as described in U. S. patent application Serial No. 103,904, filed July 9, 1949, Patent No. 2,646,548, for "Improvements Relating to Systems for Distant Signalling by Conventional Signals," in which pulse groups representing $2^n$ discrete amplitudes are selected according to such a code that, assuming these $2^n$ amplitudes to be arranged in an increasing or a decreasing order ($n$ being the number of pulses in one group), the ($n$—1) last pulses of a group corresponding to a given amplitude have, individually, the same values as the ($n$—1) first pulses of the group corresponding to the next amplitude. The present invention more especially applies to decoder systems which, when used for receiving such coded groups should reconstitute from them the intelligence wave of variable amplitude from which they originate.

It is expressly assumed hereinafter (as it is the case, indeed, in most known communication systems using coded pulses) that all groups of $n$ coded pulses individually have the same duration, this duration being lesser than or at most equal to the period T, and even being generally considerably less, either because it is desired, in a multiplex transmission system including multiple channels in time division, to interleave a large number of communication channels or else due to the fact that it is necessary to add, to the communication signals constituted by the said groups of coded pulses, synchronization signals recurring, for instance with a period T, such synchronization signals being necessary for the operation of the receiving apparatus.

According to the present invention, there is provided a method of translating successive groups of coded electric pulses recurring with a time period T and comprising an integer number $n$ of coded pulses, each of which may be of one or of the other of two possible signalling conditions, into a variable amplitude intelligence wave, said method comprising the steps of creating, on receiving each one of said groups, and storing for a time at most equal to T, a group of $n$ electrical voltages, each of which corresponds to one pulse in said one of said groups and has one or the other of two predetermined constant values according to the signalling condition of the corresponding pulse, rapidly producing, during a time interval at most equal to T, a sequence of $2^n$ different permutation groups of $n$ voltage pulses in which each individual pulse has one or the other of the two said predetermined constant voltage values, all said permutation groups having the same duration and following each other at uniform time intervals of duration $\tau$, causing each of the ($n$—1) first pulses in each of said permutation groups to be respectively delayed by such an amount that $2^n$ different groups of $n$ simultaneous pulse voltages successively appear at $n$ terminals at $2^n$ different instants comprised inside said time interval at most equal to T, respectively comparing at said instants each one of the $n$ voltages appearing at said $n$ terminals with one of the $n$ voltages of above-said stored-group of $n$ electric voltages, emitting at that one of said instants when all compared voltages are of equal values a derived pulse of short duration, the time position of which, inside said time interval at most equal to T, thus depends upon the composition of above-said stored electrical voltage group, and demodulating successive derived pulses so obtained from above-said successive groups of coded pulses for their time position with respect to fixed reference instants so as to transform them into an intelligence wave of variable amplitude.

According to a further feature of the present invention, there is provided a device for translating signals consisting of periodic electric synchronizing signals of period T and of recurrent groups of electric coded pulses of recurrence period T including an integer number $n$ of pulses, each of which may be one or of the other of two possible signalling conditions, into a variable amplitude intelligence wave, comprising a generator of periodic voltage pulses of period T, means for synchronizing said generator by said synchronizing signals, means for creating and storing, on receiving each one of said groups of coded pulses, a group of $n$ electrical voltages, each of which corresponds to one pulse in said one of said groups and has one or the other of two predetermined constant values according to the signalling condition of the corresponding pulse, means controlled by said generator for creating during a time interval at most equal to T a series of $2^n$ electric voltage pulses spaced in time at uniform intervals of duration $\tau$, means controlled by said generator for creating during said same time interval at most equal to T, a sequence of coded pulses successively reproducing once, and at time intervals equal to said duration $\tau$ each one of the $2^n$ possible permutation groups of $n$ voltages, pulses having one or the other of the two said predetermined voltage values, a chain of delay networks in cascade connection having a total delay time at least equal to $(n-1)$ times said duration $\tau$ and provided with $n$ connection points spaced along said chain in such a manner that the propagation time from one point to the next be equal to said duration $\tau$, means for applying above-said sequence of coded pulses at one end of said chain, an end impedance for terminating said chain at its other end so as to avoid pulse reflections at said other end, a voltage comparator for comparing each of the $n$ voltages appearing at said $n$ connection points to one voltage of above-said stored voltage group, means for controlling said comparator by pulses from above-said series of $2^n$ electric voltage pulses, means controlled by said comparator for emitting a derived pulse when equality voltage value in each pair of compared voltages is founded, a demodulator for demodulating successive derived pulses so derived from successively received coded pulse groups for their time position modulation with respect to fixed reference instants defined from above-said generator and means for impressing signals received at the output of said demodulator upon a working circuit.

It is well known that groups of binary pulses may be arranged in $2^n$ different manners and thereby afford the representation of $2^n$ different amplitude values. A basic sequence of N bivalent symbols may also be written, provided N be large enough, in such a way that $2^n$ different groups of $n$ bivalent symbols are successively found at regular intervals, in the said sequence. A most economical way of doing so is to write $2^n+(n-1)$ bivalent symbols in such an order that all the $2^n$ possible permutation combinations are successively found by shifting the rank of the group in the sequence by one unit. While the application of the principle of the invention is not limited to the use of a basic sequence of the latter type, it will be assumed, in the following description, that such is the case, this being only done for greater simplicity and due to the fact that one of the simplest embodiments of the invention is thus effected.

To simplify the description, there will be considered, hereinafter, by way of example, the particular case when $n=3$, i. e. when the groups of coded pulses each comprise three pulses capable of assuming, individually, two values which will be respectively represented by the figures 0 and 1. Moreover, for greater simplicity, it will be assumed that one of the values capable of being assumed by the pulses is effectively zero, i. e. that the pulses may individually be, either absent (value 0) or present (value 1).

Groups of three binary pulses may be arranged in eight different manners and, consequently, afford the representation of eight distinct amplitudes. For instance, for representing eight distinct amplitudes of an intelligence wave, corresponding to the integer numbers from 1 to 8, the eight groups may be:

000 001 011 111 110 101 010 100

These groups may be formed by taking out, from the sequence

0001110100111 . . .

successive three-figure groups, by shifting of one figure from one group to the next one.

It is clear that if there is produced, by any means, a series of ten two-valued pulses, the composition of which is represented by the said basic sequence, all possible permutation groups will be successively found therein, each permutation group appearing once; this occurring, if one takes as an origin for time the beginning of the production of the sequence, at a time variable according to the particular composition of the considered group.

More generally speaking, in the practice of the invention, the above-mentioned series of at least $2^n$ pulses and the whole sequence of N coded pulses will be produced during a time interval at most equal to and preferably slightly lesser than T. Designating by the Greek letter $\tau$ the repetition period of the pulses in the said series, such arrangements will be taken that the product $2^n.\tau$ be lesser than T and that changing from one coded pulse group (permutation combination) to the next different one be effected in the said sequence at regular time intervals also equal to $\tau$. It will be seen hereinafter how things can be arranged in such a manner that, at $2^n$ recurrent instants separated by time intervals equal to $\tau$ and defined from the pulses of the above-said series, comparisons be made of a received coded pulse group with every possible group present in the said sequence, a single one of the said comparisons revealing identity. The received group is thus identified by the rank of the identical group of the sequence; $2^n$ comparisons will thus be effected during each time interval T, at $2^n$ instants corresponding to $2^n$ pulses of the said series, some of its pulses being possibly unused if, as it occurs in certain embodiments of the invention, the series includes more than $2^n$ pulses.

As already mentioned, it is possible to build a sequence of coded pulses fulfilling the required conditions by taking N equal to $2^n+(n-1)$. While the scope of the invention is not limited to that particular embodiment, it will now be assumed that such is the case.

The invention will be better understood from the following description and with reference to the appended drawings which illustrate, by way of example, a type of embodiment utilizing the method in accordance with the invention and wherein:

Figure 1 is a diagram of a device for generating a sequence of coded pulses essentially comprising a tube whose working principle is similar to that described in U. S. patent application Serial No. 103,904, above-mentioned, and in abandoned U. S. patent application Serial No. 270,397, filed February 7, 1952, for "Electron Tube Coder Device" and designed, in an embodiment of a receiving device according to the present invention for the periodic production, during time intervals recurring at the period T, of the coded sequence of $(2^n+n-1)$ pulses, above mentioned, having a composition identical with that of the basic sequence and also, simultaneously and with the same period, for the production of a sequence of $(2^n+n-1)$ non coded pulses (i. e. all present).

Figure 1:
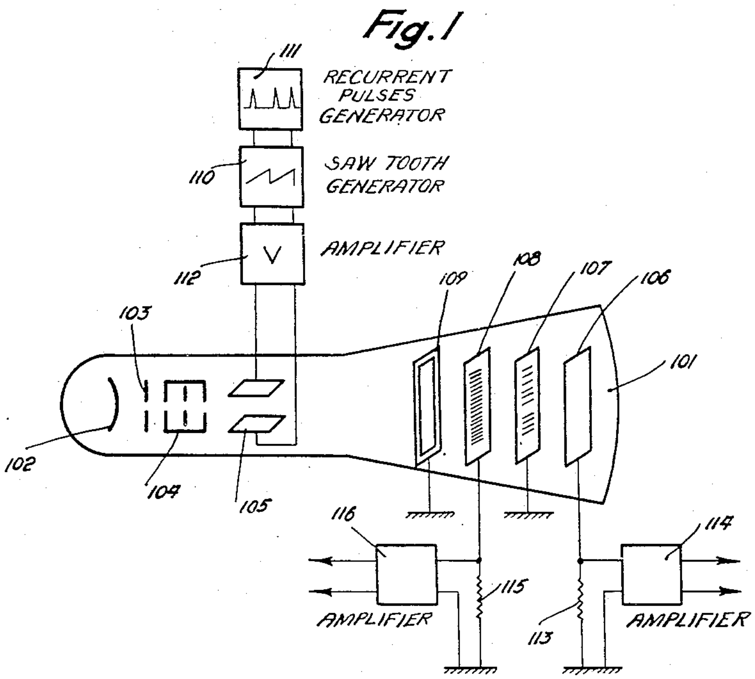

In Figure 1, there is shown a cathode ray tube 101, which comprises a cathode 102, a control electrode for the intensity of the beam, 103, focussing electrodes 104, deflecting plates 105, a main anode 106. In front of said anode and on the path of the electronic beam, are interposed a first apertured electrode or mask 107, and a second electrode, also apertured or "grid" 108. The tube 101 also comprises a secondary anode 109 provided with a large aperture. The latter is not used in the operation of the device according to the present invention and is normally grounded.

The mask 107 is divided, along the sweep of the electronic beam, when the latter is deflected under the action of a voltage applied to the deflecting plates 105, into $(2^n+n-1)$ zones, some of which are solid and the other ones comprise a window. The succession of solid portions and windows is in accordance with the composition of the basic sequence hereabove referred to.

The grid 108 is also divided into a similar number of zones, corresponding to those of the mask, each one of them comprising a window with a width at least equal to that of the windows of the mask 107.

The deflecting plates 105 are subjected to a periodic "saw-tooth" voltage wave, generated by a generator 110. The recurrent frequency of the saw-toothed wave is controlled by a recurrent pulse generator III, controlled by synchronization signals, so that these recurrent pulses have the recurrence period T of the received pulse groups. The synchronization is assumed to be ensured by elements not shown in Figure 1. An amplifier for the saw-toothed wave is also provided.

The main anode of the tube 101 is connected to a point of constant potential, called "ground" hereinafter, through a resistance 113. The voltage developed across this resistance by the anode current is amplified by the amplifier 114.

The mask 107 is grounded. The grid 108 is connected to ground through a resistance 115. The voltage developed across this resistance by the grid current is amplified by an amplifier 116.

The voltage sources supplying the other electrodes have not been represented; they are in accordance with common practice.

This device operates as follows:

During the application to the deflecting plates 105 of the portion increasing linearly with time of the saw-toothed voltage wave supplied by the generator 110, with the recurrence period T of the generator 111, and amplified by the amplifier 112, the electronic beam, gradually deflected, sweeps the anode 106 for a time interval which is a fraction of T, going successively through the windows of the grid 108 and of the mask 107. While sweeping the successively solid or empty portions of the mask 107 it generates, in the circuit of the main anode 106, pulses of current, which are either absent when the beam, after going through a window of the grid 108 meets a solid zone of the mask 107, the electrons being collected by said mask, or present when the beam successively goes through a window of both grid 108 and said mask 107, the electrons being thus effectively collected by the anode 106.

If the mask 107 comprises, for instance, ten zones, successively, encountered along the sweep of the beam, corresponding to ten successive windows of the grid 108 and if these zones are such that there be successively three solid zones, three window zones, one solid zone, one window zone and two solid zones, the current pulses in the anode circuit will represent the coded sequence or basic sequence:

0001110100 already mentioned above.

There will be thus collected, at the output of the amplifier 114, amplified voltage pulses corresponding to this basic sequence.

The grid 108 comprising, on the contrary, regularly spaced windows, there will be collected, in the circuit of said grid, a series of current pulses, all present, resulting from the impact of the beam on the solid zones separating the windows of the grid 108, the emission of said series being synchronized with that of the previous basic sequence.

There will thus be collected, at the output of the amplifier 116, a sequence of amplified but uncoded voltage pulses, i. e. all present, synchronous with the preceding coded pulses.

Figure 2:
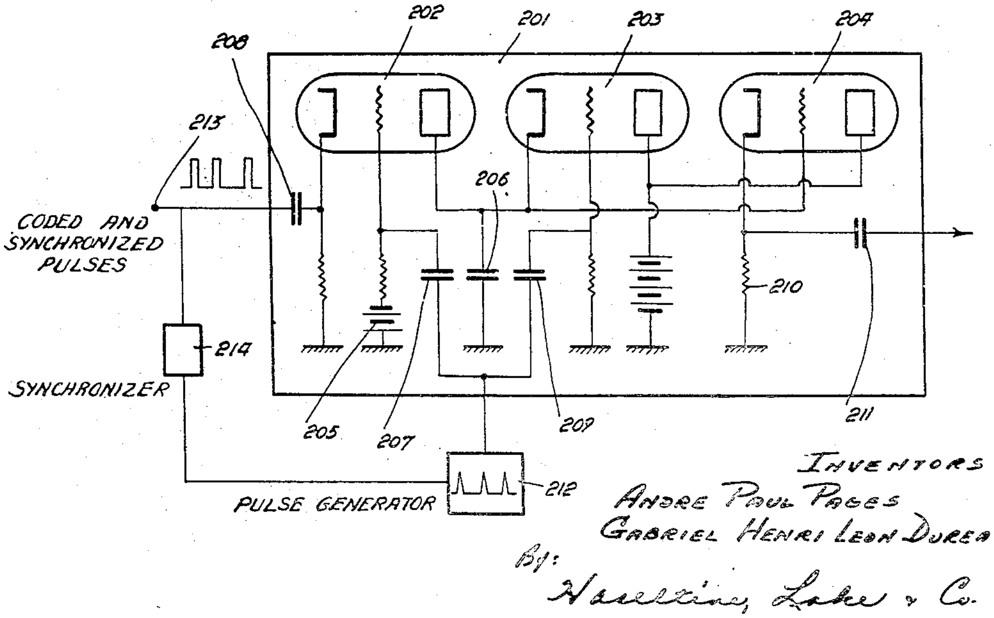
Figure 2 is a diagram of a storing device, similar to that described in abandoned U. S. patent application Serial No. 270,396, filed February 7, 1952, for "Improvements in Electric Signalling Devices."

There is shown, in Figure 2, a storing device 201 of the type described in the above mentioned U. S. patent application Serial No. 270,396.

Two electronic tubes 202 and 203 each one of them comprising at least one cathode, a control grid and an anode, 202 and 203 are normally locked, i. e. made non-conducting, the first one by virtue of a negative voltage from a source 205 and applied in its grid circuit, the second one by virtue of a condenser 206 inserted between its cathode and ground, said cathode, on the other hand, being connected with the anode of the tube 202.

The tube 202 may be made conducting by the simultaneous application of two pulses, one from a local pulse generator 212 transmitted to its grid through a condenser 207, the other one coming from an outer circuit and constituted, in fact, by one pulse from a coded group received at 213 and transmitted to its cathode through a condenser 208.

The tube 203 may be made conducting by the first one of these pulses, transmitted to its grid through a condenser 209.

A third electronic tube 204 has its grid connected to a condenser 206 and follows the variations of the charging voltage of this condenser. There is collected, at the terminals of a resistance 210, inserted in the cathode circuit of the tube 204 a voltage proportional to said variations, which may be transmitted to an outer circuit through a condenser 211.

The local generator 212 of recurrent pulses at the period T is controlled, in frequency and phase, by synchronizing pulses received at 213, and interleaved with the signals which it is desired to store, which are separated from the coded groups by means which are no part of the invention and represented diagrammatically at 214. This generator supplies the releasing pulses which are transmitted by the condensers 207 and 209 to the grids of the tubes 202 and 203.

When the device of Figure 2 is utilized in a receiver, in accordance with the invention, the coded pulses applied at 213 cooperate with the generator 212 and supply the releasing pulses which are transmitted through the condenser 208 to the cathode of the tube 202.

The device thus described operates as follows:

When no pulse is applied at 213, the tube 202 is released by the single pulse supplied by 212. Its grid voltage takes a predetermined peak value. The same pulse, at the same time, releases the tube 203; the voltage generated by the anode current corresponding to said grid voltage, through the internal resistance of the tube 203 determines the charging voltage of the condenser 206, a voltage which this condenser keeps after the pulse which caused it has vanished.

When a pulse applied at 213 is present, the operation is the same as above, with the difference that the anode current of the tube 202 takes a different value, due to the superposition, in its grid circuit, of two simultaneous releasing pulses: the changing voltage of the condenser 206 then takes a value different from the preceding one.

Under the action of the pulses supplied by the generator 212 and of those applied at 213, the condenser thus takes a series of charging voltages which it preserves between two successive operations each one of these voltages assuming one or the other of two values according to the code of the pulses applied at 213.

There is thus obtained at the terminals of the resistance 210, and there is eventually transmitted to an outer circuit, through the condenser 211, a series of voltages which are proportional to the previous ones.

Figures 3, 4:
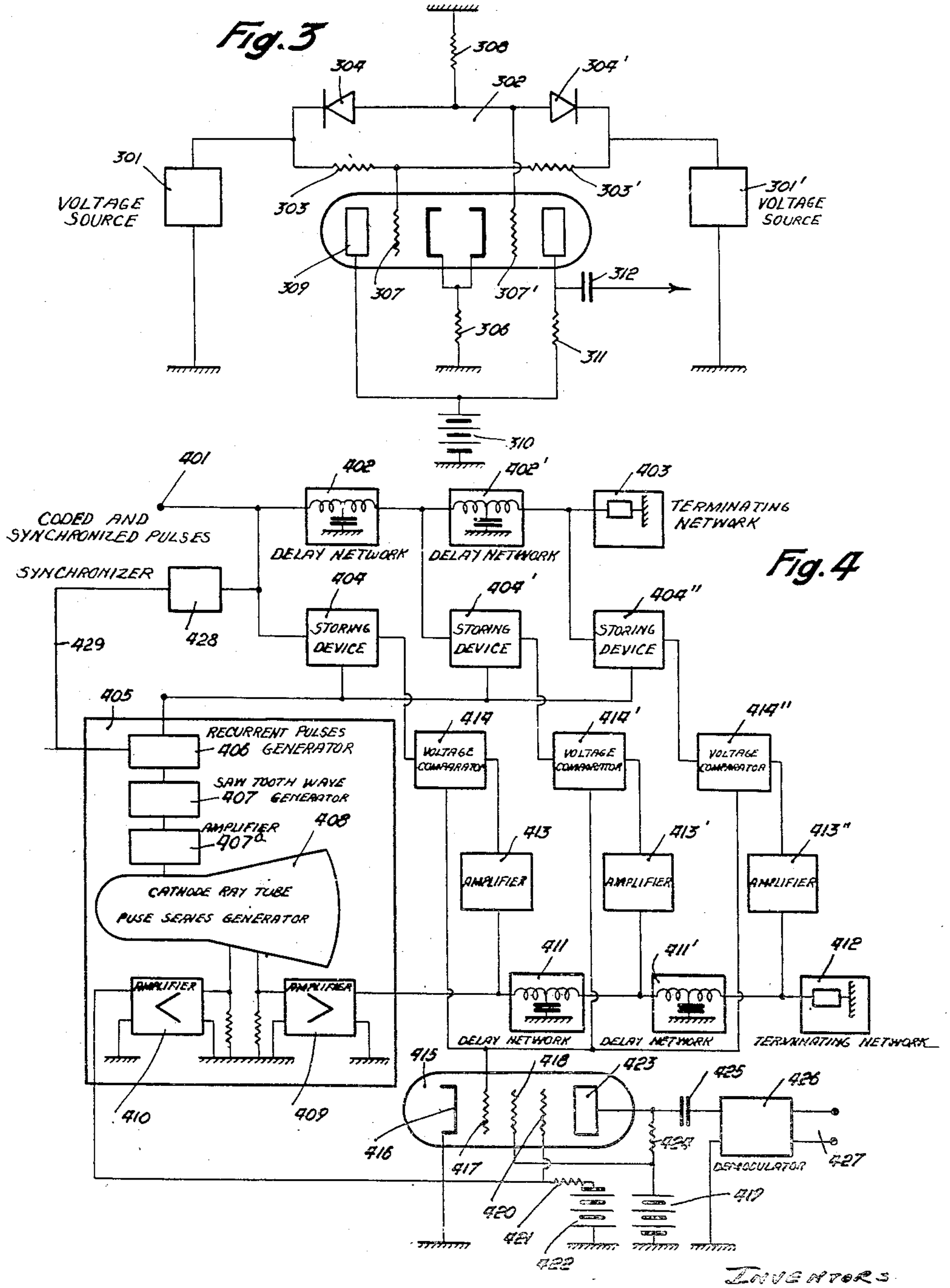
Figure 3 is a diagram of a voltage comparator device.
Figure 4 is a diagrammatic representation of a receiving device utilizing the process in accordance with the invention.

Figure 3 shows a voltage comparator capable of putting in evidence the coincidence or non-coincidence of the values of two voltages simultaneously applied to it.

In Figure 3, each one of two voltage sources 301 and 301′ can assume one or the other of two predetermined voltage values.

A bridge circuit 302 is constituted by two equal resistances 303 and 303′ and two rectifier elements 304 and 304′ mounted in opposite directions.

A twin electronic tube 305 has its cathodes connected to ground through a resistance 306. The sources 301, 301′ and the grids 307, 307′ of the tube 305 are respectively connected to the two diagonals of the bridge 302. A resistance 308 is interposed in the common circuit of the grids 307, 307′ of the tube 305. The anodes 309, 309′ of the latter are connected with an anode voltage source 310, one directly, the other one through a resistance 311. A condenser 312 transmits to an outer circuit the voltage pulses collected at the terminals of the resistance 311.

The device shown in Figure 3 operates as follows:

When the two voltages supplied by the sources 301, and 301′ have the same value, whatever may be that of the two values which occurs, the bridge 302 remains balanced and no voltage is applied between the grids of the tube 305.

When the voltage supplied by the source 301 has one of the predetermined values and that supplied by the source 301′ the other one of said values, the apparent resistances of the two rectifier elements 304, 304′ take two different values and the bridge is unbalanced. A voltage appears between the two grids 307 and 307′. Due to the coupling of the two halves of the tube through their cathodes and the dissymmetrical charge on the anodes the current which flows through the resistance 311 varies and a voltage variation may be transmitted by the condenser 312 to a utilization circuit.

Figure 4 shows, diagrammatically, the assembly of a decoder device according to the invention, converting a series of received coded pulse groups into a signalling wave with an amplitude varying in time in a continuous manner.

As in the above described examples, there has been assumed to simplify the description, that $n=3$, i. e. that the coded groups each comprise three pulses, characterized individually by their presence or absence.

In Figure 4, successive groups of three coded pulses are received at 401; they come from a transmitting system of a known type, such, for instance, as that described in the above-mentioned U. S. patent application Serial No. 103,904. These pulse groups are applied to a chain comprising delay networks 402, 402′ the delay time of which is equal to the time interval occupied by a complete group of coded pulses divided by the number $n$ of pulses, (present or absent) in this group and which are terminated without reflection on an impedance 403. Three voltage storing devices 404, 404′, 404″ are of the type shown in Figure 2. These voltage storing devices, on the other hand, are supplied by a generator 406 of recurrent period T playing the same part as 212 in Figure 2 and controlled in frequency and with a suitable phase by synchronizing signals also received at 401, and separated from the coded groups by a suitable synchronizing signal selector means represented diagrammatically at 428.

A generating assembly 405, of the type shown in Figure 1, produces the series of $(2^n+n-1)$ non-coded and 2 sequence of $2^n+(n-1)$ coded pulses and uses the same generator of recurrent pulses 406, which are used as directing pulses for the operation of the whole decoder device, for controlling a saw tooth voltage generator 407 followed by an amplifier 407*a*, an electron beam tube 408 and two output amplifiers 409 and 410 supplying respectively, in a recurrent manner, as already explained, the said series of coded pulses and sequence of non-coded pulses. The latter, after having been amplified by the amplifier 409, are applied to a chain comprising the delay networks 411 and 411′ the individual delay times of which are equal to those of the networks 402 and 402′ and which are terminated without reflection on an impedance 412.

Three amplifiers 413, 413′ and 413″ cooperate with three voltage comparator devices 414, 414′, 414″, of the type shown in Figure 3.

An electronic tube 415 comprises a cathode 416 connected to ground, a first control grid 417, connected in parallel to the outputs of the voltage comparators 414, 414′ and 414″, a second control grid 418 connected to a source of anode voltage 419, a third control grid 420 connected through a resistance 421 with a voltage source 422 and an anode 423 connected through a resistance 424 with the anode voltage source 419.

The voltage at the terminals of the resistance 424 is transmitted by a condenser 425 to a demodulator of position modulated pulses of any known type, 426, power supplied by means which have not been represented for greater simplification, with pulses having a recurrence period T, derived from the generator 406. The intelligence wave is thus reconstituted and obtained at the terminals 427 of the circuit.

The described device operates as follows:

It is assumed, in accordance with the example already considered, that the receiving device 401 gives groups of three pulses individually characterized by their presence or absence and taken from the basic sequence already considered above:

0001110100

It will be assumed, first that there is received at 401, at a certain instant, for example, the combination "101," consisting of a present pulse followed by an absent pulse and a present pulse. This group is the sixth one of the eight groups 000 001 011 111 110 101 010 100 which may be taken from the basic sequence and therefore represents the sixth one of the eight distinct amplitudes which the system makes it possible to transmit.

These three pulses are propagated in the chain of delay networks 402, 402', and are finally absorbed by the impedance 403. The transmission delay of the delay networks being equal to the time separating two pulses, there exists a predetermined instant when the peak voltages of all the pulses in one coded group are positioned at the same time on the chain at the inputs to the storing devices 404, 404' and 404''. This instant corresponds to the emission of a pulse by the generator 406, provided the abovementioned phase control of this generator 406 be suitably adjusted. This result may be obtained from synchronizing signals received at 401, by known means which are no part of the invention and which have been represented schematically at 428. If, as it is the usual practice, the said synchronizing signals consist of recurrent pulses, the said known means 428 may be constituted by a gate device eliminating the coded pulses and allowing the only synchronizing pulses to pass through itself and through the connection 429 to the said pulse generator 406.

The operation of the storing devices 404, 404', 404'' has been explained in connection with Figure 2. At the time when they are unlocked by the generator 406, the storing devices 404 and 404'' also receive a present pulse and the device 404' receives the absent intermediate pulse, i. e., actually, no pulse. The devices 404 and 404'' thus store one of the voltage values, while the device 404' stores the other voltage value, out of the two voltages which may be stored by the storing devices.

During the next phase in the decoding of the received pulse group, the device 405, the operation of which has been described in connection with Figure 1 supplies, through the amplifier 409, a sequence of ten coded pulses:

0001110100 which are applied to the chain of delay networks 411, 411', and are finally absorbed by the impedance 412. The transmission delay of the delay networks being chosen as explained above, the peak flat portions of three successive pulses pass at the same time to the inputs to the networks 411, 411', and to the impedance 412 and after being amplified by the amplifiers 413, 413' and 413'', they are applied to the voltage comparators 414, 414' and 414''.

There will now be considered, in accordance with what will be explained later, the operation of the voltage comparators 414, 414', and 414'', while the peak flat portions of three successive pulses of the coded sequence are transmitted to them by the amplifiers 413, 413' and 413''. The voltages applied at the inputs to these amplifiers, taken from the chain of the delay networks, may have two values, one of which is zero, according to whether the pulses which pass are absent or present. The amplifiers thus supply, according to the value of the corresponding passing pulse, two different output voltages, which may be adjusted in amplitude by any known means. They are actually adjusted so as to be equal, respectively, to the two voltage values which can be stored by the storing devices 404, 404', and 404''.

Upon the passing of each one of the eight groups constituted by the peak flat portions of three successive pulses, taken in the coded sequence of $2^n+n-1=10$ pulses supplied by the amplifier 409, with the exception of the sixth group "101" which coincides with the stored group, one at least of the voltage comparators 414, 414' and 414'' receives two different voltages and thus generates, in its output circuit, a pulse voltage. Upon the passing of the sixth group, the voltages applied to the three comparators are balanced and no voltage appears at that time in any one of their three output circuits.

The operation of the tube 415 will now be considered. The latter is normally locked, i. e. non-conducting, due to the value of the biasing voltage of the source 422, applied to one of its control grids 420. It receives, from the amplifier 410, as has been explained in connection with Figure 1, a series of $2^n+(n-1)$, non-coded pulses, which are transmitted to the resistance 421 and tend to release the tube 415.

The voltages supplied, as has been explained, to the first grid 417 from the outputs of 414, 414', 414'', are applied with such a polarity that their effect is to keep the tube 415 locked. It has been seen, however, that at the moment of the passing of the sixth group of three pulses, none of the voltage comparators has generated any pulse voltage in its output circuit. The tube 415 is thus released at that instant and at that instant only and there appears, then, in its anode circuit, a current pulse, called previously a derived pulse, which develops, at the terminals of the resistance 424, a pulse voltage which is transmitted by the condenser 425 to the demodulating device 426.

If one now considers a series of coded pulse groups, received successively by the receiving device 401, each group is stored, then discriminated as was explained, above, for the group "101," and a series of derived pulses is applied to the demodulator 426, the instant of the appearance of the pulses of this series depending on the position of the combination constituting each received group in the series of coded groups which can be constituted in the basic sequence.

The proper treatment for such a series of time modulated pulses is well known and demodulating devices are known which are capable of transforming it into a wave with an amplitude varying with time in a continuous manner and representing the corresponding modulation and consequently the initial intelligence wave transmitted. There is thus collected at 427 a signalling wave of amplitude varying in a continuous manner with time, which reproduces the intelligence wave applied to the transmitter except for errors inherent to the very fact of the coding, whereby only eight or, in general $2^n$ distinct amplitude values only can be transmitted.

We claim:

1. A device for translating signals consisting of periodic electric synchronizing signals of period T and of recurrent groups of electric coded pulses of recurrence period T including an integer number $n$ of pulses, each of which may be of one or of the other of two possible signalling conditions, into a variable amplitude intelligence wave, comprising a generator of periodic voltage pulses of period T, means for synchronizing said generator by said synchronizing signals, means for creating and storing, on receiving each one of said groups of coded pulses, a group of $n$ electrical voltages, each of which corresponds to one pulse in said one of said groups and has one or the other of two predetermined constant values according to the signalling condition of the corresponding pulse, means controlled by said generator for creating during a time interval at most equal to T a series of $2^n$ electric voltage pulses spaced in time at uniform intervals of duration $\tau$, means controlled by said generator for creating during said time interval at most equal to T, a sequence of coded pulses successively reproducing once, and at time intervals equal to said duration $\tau$ each one of the $2^n$ possible permutation groups of $n$ voltages, pulses having one or the other of the two said predetermined voltage values, a chain of delay networks in cascade connection having a total delay time at least equal to $(n-1)$ times said duration $\tau$ and provided with $n$ connection points spaced along said chain in such a manner that the propagation time from one point to the next be equal to said duration $\tau$, means for applying above-said sequence of coded pulses at one end of said chain, an end impedance for terminating said chain at its other end so as to avoid pulse reflections at said other end; a voltage comparator for comparing each of the $n$ voltages appearing at said $n$ connection points to one voltage of above-said stored voltage group, means for controlling said comparator by pulses from above-said series of $2^n$ electric voltage pulses, means controlled by said comparator for emitting a derived pulse when equality voltage value in each pair of compared voltages is founded, a demodulator for demodulating successive derived pulses so derived from successively received coded pulse groups for their time position modulation with respect to fixed reference instants defined from above-said generator and means for impressing signals received at the output of said demodulator upon a working circuit.

2. A device as claimed in claim 1, wherein said comparator comprises $n$ pairs of electron tubes, each of which includes at least a cathode, a control electrode and an anode, the two tubes of each of said pairs being arranged in a bridge circuit in such a way that a pulse voltage appears across an impedance connected in the anode circuit of one of said two tubes when two simultaneous voltage pulses of unequal values are respectively applied to the control electrodes of each of said two tubes, a further electron tube including at least a cathode, a first and a second control electrodes and an anode, means for impressing upon said first control electrode of said further tube voltage pulses from said series of at least $2^n$ pulses, means for impressing upon said second control electrode of said further tube the sum of all voltages received across all impedances connected in the anode circuits of said ones of said pairs of tubes with such a polarity as to suppress the anode current of said further tube, means for biasing said first control electrode of said further tube in such a manner that a current can exist in the anode circuit of said further tube only when a voltage pulse is applied to said first control electrode, and means for impressing current from said anode circuit of said further tube upon a working circuit.

3. A device as claimed in claim 1, wherein said means for producing said series of at least $2^n$ voltage pulses and said sequence of permutation groups of voltage pulses consist of an electron beam tube comprising at least a cathode for emitting electrons, means for forming an electron beam, deflecting means for deflecting said beam in a given direction, a collecting anode for collecting electrons of said beam, a first and a second apertured electrodes located in the path of said beam, said first apertured electrode being provided with a number N of apertures regularly spaced in a row along said direction, said second apertured electrode being provided with solid and apertured portions totalling said same number N arranged in a row along said direction in such a way that all possible $2^n$ permutation groups of $n$ successive solid and apertured portions be found once when sweeping said second apertured electrode along said direction and that said combinations recur at regular spacings, means controlled by said generator for applying to said deflecting means a periodic saw-tooth wave-shaped voltage of period T so as to cause said beam to sweep said first and second apertured electrodes along said direction, a first and a second impedances respectively connected to said first and second apertured electrodes, and a first and a second amplifier respectively amplifying voltages respectively received between terminals of said first and second impedances, whereby said series of at least $2^n$ pulses and said sequence of permutation groups $n$ electric voltages are respectively received at the outputs of said first and second amplifiers.

4. A device as claimed in claim 3, wherein said solid and apertured portions of said second apertured electrode of said electron beam tube are in total number $2^n+(n-1)$ and are arranged in such an order than $2^n$ different permutation groups of $n$ solid and apertured portions are constituted by all possible groups of $n$ adjacent portions.

No references cited.